United States Patent Office 3,655,894
Patented Apr. 11, 1972

3,655,894
COMPOSITIONS FOR INHIBITING GASTRIC ACID SECRETION
William A. Bolhofer, Frederick, and John J. Baldwin, Lansdale, Pa., assignors to Merck & Co., Inc., Rahway, N.J.
No Drawing. Original application Dec. 28, 1966, Ser. No. 605,206, now Patent No. 3,510,487, dated May 5, 1970. Divided and this application Aug. 28, 1969, Ser. No. 853,946
Int. Cl. A61k 27/00
U.S. Cl. 424—250  5 Claims

ABSTRACT OF THE DISCLOSURE

This application is concerned with novel 2,3-dichloroquinoxalines which may be substituted in the 5, 6, and 7-positions, the 5 or 6-position having a substituted carbamoyl group and the 7-position having as substituents hydrogen, halo, loweralkyl, or loweralkoxy. These novel quinoxalines, useful as gastric acid inhibitors, may be prepared by intimately contacting 5(6)-chlorocarbonyl-2,3-dichloroquinoxaline or the appropriately 7-substituted-6-chlorocarbonyl-2,3-dichloroquinoxaline with an amine having at least one replaceable hydrogen atom.

---

This application is a division of our application Ser. No. 605,206, filed Dec. 28, 1966, now U.S. Pat. 3,510,487 which issued on May 5, 1970.

This invention is concerned with novel quinoxaline compounds and with methods for their preparation.

While certain quinoxaline compounds are known, particularly those that have been used as dyes, fungicides, and bactericides, it has been found that a select group of heretofore unknown quinoxaline compounds possess the unique property of inhibiting gastric secretion in mammals. The preferred products heretofore and currently used to control gastric acidity are mainly either anticholinergic agents or antacids. The anticholinergic agents have the disadvantage in that they act by or through the nervous system by blocking the nerve impulses to the cells of the gastric mucosa responsible for secretion of acid. Because of their effect on the nervous system, the anticholinergic agents are non-specific, additionally affecting other secretory mechanisms of the body as well as other body functions dependent in whole or in part on stimulation by the nervous system. The antacid compounds on the other hand, have limited effectiveness as they act only to neutralize the acid after it has been secreted into the stomach, and furthermore, have a very short duration of activity.

The quinoxaline compounds of this invention do not act by either of the above mechanisms and thus afford a new approach to acid inhibition as they control acid production of the gastric mucosa cellular level. Pharmacological studies indicate that the quinoxalines of this invention affect inhibition at the enzyme level and in addition are effective in inhibiting histamine stmulated gastric secretion, an important property not shared with other types of gastric acid inhibitors.

The novel compounds of this invention that have been found to possess this property to a marked degree are 2,3-dichloroquinoxaline compounds that contain in the 5 or 6-position a substituted carbamoyl group and which may have additional substituents in the 7-position when the substituted carbamoyl radical is in the 6-position. These compounds may be described as having the general formula

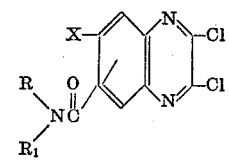

Formula 1 wherein X represents only hydrogen when the carbamoyl radical is in the 5-position and hydrogen, loweralkyl, loweralkoxy and halo when the carbamoyl radical is in the 6-position and R is hydrogen and $R_1$ or both R and $R_1$ may each represent loweralkyl (straight, branched or cyclic),
phenylhydroxyloweralkyl,
haloloweralkyl,
diloweralkylaminoloweralkyl,
acylaminoloweralkyl,
hydroxyloweralkyl,
dihydroxyloweralkyl,
loweralkoxyloweralkyl,
acyloxyloweralkyl, or loweralkyl substituted with a 5 or 6-membered heterocycle, containing one or more hetero atoms selected from the group consisting of oxygen, sulfur or nitrogen, diloweralkylaminophenyl,
mono or dihalophenyl,
mono or diloweralkoxyphenyl,
mono or diloweralkylphenyl,
hydroxyloweralkylphenyl,
loweralkylhalophenyl,
loweralkylloweralkoxyphenyl,
loweralkoxyhalophenyl,
alkenyl,
alkynyl, or a 5 or 6-membered heterocycle, having at least one hetero atom selected from the group consisting of oxygen, sulfur, or nitrogen, or R and $R_1$ may be joined together to form a heterocyclic group which may have a hetero atom selected from the group consisting of oxygen, sulfur, or nitrogen in addition to the hetero nitrogen attached to the carbonyl function, and the hetero group formed may be substituted with a hydroxyl or a loweralkyl group.

When X represents halo, included are chlorine, bromine and fluorine; when loweralkyl, included are methyl, ethyl, propyl and butyl; and when loweralkoxy, included are methoxy, ethoxy, propoxy and butoxy.

In addition, R and/or $R_1$ may be a phenyl group substituted with a diloweralkylamino radical such as dimethylamino, or diethylamino; or the phenyl group may be substituted with a hydroxyloweralkyl radical such as hydroxyethyl, hydroxypropyl, or hydroxybutyl.

R and/or $R_1$ may represent loweralkyl, examples of which include methyl, ethyl, propyl, isobutyl, and hexyl. This loweralkyl group may be further substituted with a halogen atom such as chlorine or bromine; a diloweralkylamino radical, examples of which are dimethylamino or diethylamino; an acylamino radical represented by benzoylamino and lower-alkanoylamino, the latter particularly exemplified by acetylamino, proprionylamino, butyrylamino; an alkoxy group such as methoxy, ethoxy or propoxy; or an acyloxy radical such as benzoyloxy, acetyloxy, proprionyloxy or butyryloxy. The alkyl group may also be substituted by having attached to one of the carbon atoms a 5 or 6-membered heterocyclic radical such as pyridyl, pyrimidinyl, piperidyl, thiazolyl, isothiazolyl, thiadiazolyl, methylpiperazino, imidazolyl, morpholino, thiomorpholino, tetrahydrofuranyl and the like.

R and/or $R_1$ may also represent a loweralkyl group substituted with one or more hydroxy groups in which case R and/or $R_1$ may be hydroxyethyl, hydroxypropyl, 1-methyl-2-hydroxyethyl, dimethylhydroxyethyl, 2,3 - dihydroxypropyl. Additionally, R and/or $R_1$ may be a disubstituted loweralkyl group such as phenylhydroxyethyl or phenylhydroxypropyl, in which case the phenyl and hydroxy groups may be the same or different carbon atoms of the alkyl chain.

In addition, R and/or $R_1$ may be a phenyl group substituted with a halogen such as chlorine or bromine, a loweralkoxy group such as methoxy, ethoxy or propoxy, a loweralkyl radical such as methyl, ethyl, propyl and butyl, or the phenyl group may be disubstituted with any two of the above-mentioned substituents, and they may be the same or different.

R and/or $R_1$ may also be a cycloloweralkyl group such as cyclopropyl or an unsaturated aliphatic hydrocarbon such as alkenyl, exemplified by 3-butenyl, 2-butenyl, allyl, and methallyl or alkynyl illustrated by propynyl, 2-butynyl or 3-butynyl.

Examples of where R and/or $R_1$ is a heterocyclic radical are pyridyl and thiazolyl, isothiazolyl, imidazolyl, pyrimidinyl and piperidyl.

Examples of R and $R_1$ being joined together to form a heterocycle are morpholino, thiomorpholino, piperidino, piperazino, and imidazolyl, hydroxypiperidino and methylpiperazino.

Although R and $R_1$ may represent the same or different substituents, a preferred embodiment is where X is hydrogen and R and $R_1$ are different radicals attached to the carbamoyl group in the 6-position, and particularly where R and X are both hydrogen and $R_1$ is a subsequent of one of the groups described above. An especially useful compound of the class represented by Formula 1 is 6-(hydroxyloweralkylcarbamoyl) - 2,3 - dichloroquinoxaline (hydroxyloweralkylcarbamoyl) - 2,3 - dichloroquinoxaline, and more specially, 6-(2-hydroxyethylcarbamoyl)-2,3-dichloroquinoxaline.

The novel compounds of this invention advantageously can be prepared by intimately contacting an appropriately substituted amine with 6-chlorocarbonyl-2,3-dichloroquinoxaline or 6-chlorocarbonyl-7-(halo, loweralkyl or alkoxy)-2,3-dichloroquinoxaline.

For the sake of simplicity the following discussion of the processes are in terms of the 6-substituted carbamoyl-2,3-dichloroquinoxalines, although it equally applies to the 5-substituted carbamoyl-2,3-dichloroquinoxalines.

The reaction may be schematically represented as:

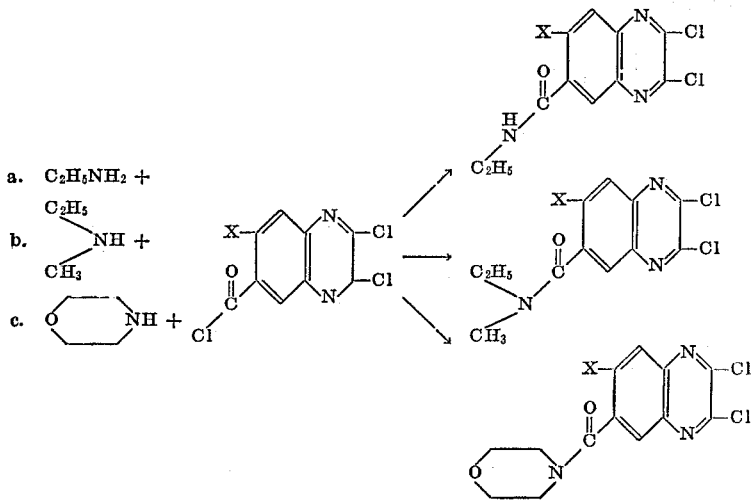

where X represents hydrogen, halo, loweralkyl, or loweralkoxy. The resulting substituent on the 6-position carbonyl of the 2,3-dichloroquinoxaline is entirely dependent upon the type of amine used as a starting reactant.

Although the foregoing schematic representation particularly describes the preparation of 2,3-dichloroquinoxalines wherein the carbamoyl radical is in the 6-position, it should be understood that if 5-chlorocarbonyl-2,3-dichloroquinoxaline is used, the quinoxaline formed will have the carbamoyl radical in the 5-position, in which case X is hydrogen.

Thus, it may be seen that where a primary amine as in "a." above is used, a 2,3-dichloroquinoxaline or 7-(halo, loweralkyl or alkoxy)-2,3-dichloroquinoxaline is formed, containing a mono-substituted carbamoyl radical in the 6-position. When a secondary amine as in "b." above is used, a disubstituted 2,3-dichloroquinoxaline or 7-(halo, loweralkyl or alkoxy)-2,3-dichloroquinoxaline is formed, having attached at the 6-position a disubstituted carbamoyl radical, the substituents being the same or different, depending on the substituents of the amine. Also, when a heterocyclic compound containing a ring nitrogen attached to a replaceable hydrogen is used, a 2,3-dichloroquinoxaline or a 7-(halo, loweralkyl or alkoxy)-2,3-dichloroquinoxaline is formed, having attached at the 6-position a carbamoyl group wherein the nitrogen atom attached to the carbon of the carbonyl function forms an integral part of a heterocyclic ring.

In addition, if the amine starting reactant has a second basic substituent in the molecule, it is obvious to one skilled in the art that the novel quinoxalines may be isolated as the free base or as the acid addition salt such as the hydrochloride, citrate or sulfate.

From the above description it is apparent to one skilled in the art that wide variety of 5- or 6-substituted carbamoyl-2,3-dichloroquinoxalines or 6-substituted carbamoyl 7-(halo, loweralkyl or alkoxy)-2,3-dichloroquinoxalines may be prepared according to the above described process by using known amines which have in addition to at least one replaceable hydrogen atom, varying side chains.

While temperature is not a critical or limiting feature in this process, a preferred embodiment is to carry out the reaction at room temperature, although higher or lower temperatures may be used.

Although the preferred embodiment utilizes a solvent media, it is not necessary, and the reaction will proceed in its absence. Suitable solvents which may be used, however, include dioxane, ether, benzene, tetrahydrofuran, toluene and the like.

The novel compounds of this invention effectively inhibit acid secretion for a period of hours. For this reason the quinoxaline compounds of this invention have special value in the prophylaxis and treatment of peptic ulcers. While the preferred dose is a function of the specific compound used and the individual requirements, generally the compounds of this invention are administered in a total daily dose of from about 0.5–500 mg., the preferred dose level being from about 1–100 mg. At the recommended doses these compounds have a very favorable therapeutic ratio.

As the compounds contemplated within the scope of this invention are effective upon oral administration, they can be compounded in any suitable oral dosage form, as in tablet, capsule, suspension, or other liquid or solid form that can be prepared by procedures well known in the art. Thus, these novel compounds may be admixed with a suitable diluent such as lactose, and encapsulated; or they may be combined with suitable binding agents and expanding agents and compressed into tablet form. In addition, a liquid pharmaceutical may be obtained by dissolving or suspending the novel compounds of this invention in a suitable flavored vehicle. While the compounds are also active upon parenteral administration, the oral route is generally preferred.

Typical formulations for preparing tablets, capsules, and liquids containing the novel quinoxalines are described below. It should be recognized by one skilled in the art that the formulations represent only one method for making the desired pharmaceutical composition. Factors such as the desired size of the tablet or capsule will be a determining factor as to the amount of diluent required. The type of diluent will be determined by the hardness of the tablet desired, or whether it is to be made by the wet, dry, or direct compression method. Also to be considered is whether other active ingredients are to be included in the formulation, which may be of benefit in controlling hypergastric acidity in a secondary manner, such as the barbiturates and tranquilizers and the like.

TABLET CONTAINING 25 MG. OF 6-(2-HYDROXYETHYL-CARBAMOYL)-2,3-DICHLOROQUINOXALINE

|  | Each tablet, mg. | 1000, tablet, mg. |
| --- | --- | --- |
| 6-(2-hydroxyethylcarbamoyl)-2,3-dichloro-quinoxaline | 25 | 25 |
| Starch | 20 | 20 |
| Lactose (powder) | 20 | 20 |
| Talc | 5 | 5 |
| Wt. of granulation | 70 | 70 |

Mix all of the ingredients and then compress into slugs. The slugs should then be ground to form granules that will pass through a 14–16 mesh screen. The granules may then be re-compressed into tablets, using a suitable compression mold to form tablets, each weighing 70 mg.

Capsule containing 50 mg. of 6-(2-hydroxyethylcarbamoyl)-2,3-dichloroquinoxaline

|  | Mg. |
| --- | --- |
| 6-(2-hydroxyethylcarbamoyl)-2,3-dichloroquinoxaline | 50 |
| Lactose | 150 |
|  | 200 |

Mix the ingerdients so as to evenly distribute the active ingredient throughout the lactose. Pack the powder into No. 2 empty gelatin capsules. Each capsule should have a net weight of 200 mg.

Suspension containing 5 mg. per 5 cc. of 6-(2-hydroxyethylcarbamoyl) 2,3-dichloroquinoxaline 1,000 ml.

6-(2-hydroxyethylcarbamoyl)-2,3-dichloroquinoxaline—1 gm.
Tragacanth—30 gm.
Amaranth—10 gm.
Syrup wild cherry U.S.P.—600 ml.
Distilled water q.s. ad—1,000 ml.

Hydrate the tragacanth with sufficient water to form a smooth paste and to this add the 6-(2-hydroxyethylcarbamoyl)-2,3-dichloroquinoxaline, followed by the Amaranth which has previously been dissolved in distilled water and the syrup of wild cherry. The suspension is then brought to a volume of 1,000 ml. with distilled water and stirred well to suspend the added materials. Each 5 ml. will contain 5 mg. of 6-(2-hydroxyethylcarbamoyl)-2,3-dichloroquinoxaline.

The following examples illustrate methods used for preparing the novel quinoxaline compounds of this invention. It is to be understood, of course, that the examples are not to be considered limitative.

6-carbamoyl-2,3-dichloroquinoxaline and 5-substituted carbamoyl-2,3-dichloroquinoxalines may be prepared according to the following procedures:

EXAMPLE 1

6-(2-hydroxyethylcarbamoyl)-2,3-dichloroquinoxaline

A solution containing 0.048 mole of ethanolamine in 23 ml. of dioxane is added fractionally to a stirred solution of 0.023 mole of 6-chlorocarbonyl-2,3-dichloroquinoxaline in 52 ml. of dioxane at room temperature. The reaction is slightly exothermic. The mixture is stirred until it has cooled to about room temperature and then concentrated in vacuo to about ⅓ its volume. 100 ml. of water is then added. 6-(2-hydroxyethylcarbamoyl)-2,3-dichloroquinoxaline precipitates and is collected by filtration. The solid is recrystallized from acetonitrile to give substantially pure material, M.P. 181–183° C.

EXAMPLE 2

6-(diethylcarbamoyl)-2,3-dichloroquinoxaline

By repeating the procedure of Example 1 at a temperature of 15° C. using diethylamine as the starting amine reactant and ether as a solvent, 6-(diethylcarbamoyl)-2,3-dichloroquinoxaline is obtained, having a melting point of 73–75° C.

EXAMPLE 3

6-(2-methoxyethylcarbamoyl)-2,3-dichloroquinoxaline

By repeating the procedure of Example 1 at a temperature of 80° C. using methoxyethylamine as the starting reactant and benzene as a solvent 6-(2-methoxyethylcarbamoyl)-2,3-dichloroquinoxaline is obtained, M.P. 141–142° C.

EXAMPLE 4

6-(2-hydroxyethylcarbamoyl)-2,3,7-trichloroquinoxaline

Step A.—A mixture of 5.23 g. of 2-chloro-4,5-diaminobenzoic acid and 210 ml. of diethyl oxalate is refluxed for four hours and then allowed to cool to 27° C. 2,3-dihydroxy-7-chloroquinoxaline-6-carboxylic acid separates and is filtered, yielding 7.22 g. melting above 300° C.

Step B.—A mixture of 5 g. of 2,3-dihydroxy-7-chloroquinoxaline-6-carboxylic acid, 12.95 g. of phosphorus oxychloride is refluxed for 45 minutes. The phosphorus oxychloride is then removed by distillation and the residue poured onto ice water to yield a solid which is removed by filtration. After recrystallization from hexane, 280 mg. of 6-chlorocarbonyl-2,3,7-trichloroquinoxaline, melting at 82–85° C., is obtained. The product can be further purified by recrystallization from hexane and melts at 93–95° C.

Step C.—A solution of 0.029 g. of ethanolamine in 2 ml. of dioxane is added dropwise and with stirring at 27° C. to a solution of 0.07 g. of 6-chlorocarbonyl-2,3,7-trichloroquinoxaline in 5 ml. of dioxane. The solution is stirred at 27° C. for fifteen minutes, concentrated to 2 ml. and diluted with 15 ml. of water. A solid separates, is filtered and recrystallized from n-butylchloride-acetonitrile to yield 0.02 g. of 6-(2-hydroxyethylcarbamoyl)-2,3,7-trichloroquinoxaline, melting at 204–205° C.

EXAMPLE 5

6-(2-dimethylaminoethylcarbamoyl)-2,3-dichloro-quinoxaline

A suspension of 570 mg. of 6-(2-dimethylaminoethylcarbamoyl)-2,3-dichloroquinoxaline hydrochloride in 50 ml. of ethyl acetate is treated and extracted with 25 ml. of saturated sodium bicarbonate solution. The ethyl acetate layer is separated, washed with water, dried over sodium sulfate, and concentrated to yield 440 mg. of 6 - (2 - dimethylaminoethylcarbamoyl)-2,3-dichloroquinoxaline. After recrystallization from n-butylchloride, the free base melts at 158–160° C.

EXAMPLE 6

6-(2-morpholinoethylcarbamoyl)-2,3-dichloroquinoxaline

A suspension of 1 g. of 6-(2-morpholinoethylacarbamoyl)-2,3-dichloroquinoxaline hydrochloride in 100 ml. of ether is treated and extracted with 50 ml. of saturated sodium bicarbonate solution. The ether layer is separated, washed with water, dried over sodium sulfate and concentrated to yield 450 mg. of 6-(2-morpholinoethylcarbamoyl)-2,3-dichloroquinoxaline. After recrystallization from isopropyl alcohol, the pure free base melts at 163–166° C.

EXAMPLE 7

5-(2-hydroxyethylcarbamoyl)-2,3-dichloroquinoxaline

A solution of (0.61 g., 0.01 mole) ethanolamine in 5 ml. of chloroform is added to a stirred solution of (1.30 g., 0.001 mole) 2,3-dichloro-5-chlorocarbonyl-2,3-dichloroquinoxaline in 25 ml. of chloroform. After mixing the two solutions, the reaction is stirred for ½ hour. The chloroform solution is then washed with 25 ml. of water, dried over sodium sulfate and concentrated to yield a crystalline residue. Recrystallization from toluene gives pure 5-(2 - hydroxyethylcarbamoyl)-2,3-dichloroquinoxaline, which melts at 154.5–156.5° C.

EXAMPLE 8

6-(2-dimethylaminoethylcarbamoyl)-2,3-dichloroquinoxaline hydrochloride

A solution containing 0.004 mole unsymmetrical N,N-dimethylethylenediamine in 5 ml. of dioxane is added with stirring at room temperature to a solution of 0.004 mole 6-chlorocarbonyl-2,3-dichloroquinoxaline in 10 ml. of dioxane. An oil separates and solidifies. The solid is recrystallized from isopropanol to yield 6-(2-dimethylaminoethylcarbamoyl) - 2,3-dichloroquinoxaline hydrochloride, M.P. 224–226° C.

Specific compounds which may be prepared by the foregoing procedures of Example 1 are set forth in Table I, the particular end product obtained being indicated by the description of the symbols R and $R_1$. The table also gives the amine starting reactant used and the melting point of the 6 - carbamoyl-2,3-dichloroquinoxaline obtained.

TABLE I

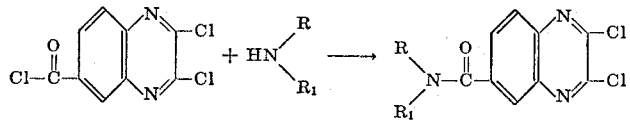

| Exp. No. | R | $R_1$ | Amine starting reactant | Melting pt. of I in ° C. |
|---|---|---|---|---|
| 1 | —CH$_2$CH$_2$O$\overset{O}{\overset{\|}{C}}$CH$_3$ | H | H$_3$C—$\overset{O}{\overset{\|}{C}}$—O—CH$_2$CH$_2$NH$_2$ | 161.5–163.5 |
| 2 | —CH$_3$ | H | CH$_3$NH$_2$ | 213–215 |
| 3 | —CH$_3$ | CH$_3$ | (CH$_3$)$_2$NH | 138–139 |
| 4 | —C$_2$H$_5$ | H | C$_2$H$_5$NH$_2$ | 191–196 |
| 5 | —C$_2$H$_5$ | C$_2$H$_5$ | (C$_2$H$_5$)$_2$NH | 73–75 |
| 6 | n-C$_3$H$_7$ | H | n-C$_3$H$_7$NH$_2$ | 158–160 |
| 7 | —CH$_2$CH$_2$OH | H | HOCH$_2$CH$_2$NH$_2$ | 181–183 |
| 8 | —CH$_2$CH$_2$OH | —CH$_2$CH$_2$OH | (HOCH$_2$CH$_2$)$_2$NH | 123–125 |
| 9 | —CH$_2$CH$_2$OH | CH$_3$ | HOCH$_2$CH$_2$$\overset{CH_3}{\overset{\|}{N}}$H | 128–130 |
| 10 | —$\overset{CH_3}{\overset{\|}{C}}$HCH$_2$OH | H | HOCH$_2$$\overset{CH_3}{\overset{\|}{C}}$HNH$_2$ | 157–159 |
| 11 | —CH$_2$$\overset{CH_3}{\overset{\|}{C}}$H—OH | H | HO$\overset{CH_3}{\overset{\|}{C}}$H—CH$_2$NH$_2$ | 180–182 |
| 12 | —CH$_2$$\overset{CH_3}{\overset{\|}{\underset{\|}{C}}}$—OH $\atop$ CH$_3$ | H | HO—$\overset{CH_3}{\overset{\|}{\underset{\|}{C}}}$—CH$_2$NH$_2$ $\atop$ CH$_3$ | 185–187 |
| 13 | —n-C$_3$H$_6$OH | H | HO—CH$_2$CH$_2$CH$_2$NH$_2$ | 136–138 |
| 14 | —CH$_2$CH$_2$OCH$_3$ | H | CH$_3$OCH$_2$CH$_2$NH$_2$ | 141–142 |
| 15 | —CH$_2$CH$_2$Cl | H | ClCH$_2$CH$_2$NH$_2$ | 165–166 |
| 16 | —CH$_2$—CH=CH$_2$ | H | CH$_2$=CH—CH$_2$NH$_2$ | 166–167.5 |
| 17 | HOCH$_2$CH$_2$—⟨◯⟩— | H | HOCH$_2$CH$_2$—⟨◯⟩—NH$_2$ | 217–218 |
| 18 | —CH$_2$—⟨O⟩ | H | ⟨O⟩—CH$_2$NH$_2$ | 149–150 |
| 19 | ⟨◯⟩—OH ⟨◯⟩—OH | | HO—⟨◯⟩NH | 186–189 |
| 20 | △— | H | △—NH$_2$ | 208–210 |

Footnotes at end of table.

TABLE I—Continued

| Exp. No. | R | R₁ | Amine starting reactant | Melting pt. of I in °C. |
|---|---|---|---|---|
| 21 | cyclohexanol (OH on cyclohexyl) | ----- | 2-aminocyclohexanol | 166–167.5 |
| 22 | thiazolyl | H | 2-amino-thiazole (H₂N—thiazole) | 256.5–257.5 |
| 23 | tetrahydropyranyl (O in ring) | ----- | 4-amino-tetrahydropyran (NH on ring) | 112–114 |
| 24 | —CH₂CH(OH)—CH₂OH | H | HOCH₂CH(OH)—CH₂NH₂ | 169–172 |
| 25 | pyrazolyl (N=N ring) | ----- | amino-pyrazole | 160–161.5 |
| 26 | —C₆H₄—N(CH₃)₂ | H | (CH₃)₂N—C₆H₄—NH₂ | 243–244 |
| 27 | 2-pyridyl | H | 2-aminopyridine | 204–205 |
| 28 | 4-pyridyl | H | 4-aminopyridine | ¹ 190 |
| 29 | —CH₂CH₂NHC(O)CH₃ | H | CH₃C(O)NHCH₂CH₂NH₂ | 255–257 |
| 30 | —CH₂—CH(OH)C₆H₅ | H | C₆H₅CH(OH)CH₂NH₂ | 186–187.5 |

¹ Dec.

NOTE.—Examples 19, 21, 23, and 25 represent heterocyclic radicals formed by the joining of R and R₁, the omitted nitrogen being attached to the carbonyl function.

Table II sets forth specific compounds which may be obtained by following the procedure as described under Example 8, the particular end product obtained being indicated by the description of the symbols R and R₁. The table also gives the amine starting reactant and the melting points of the 6-carbamoyl-2,3-dichloroquinoxaline.

TABLE II $$\text{Cl-C(O)-[quinoxaline-2,3-Cl}_2\text{]} + R_1\text{NH-R} \longrightarrow R_1\text{N(R)-C(O)-[quinoxaline-2,3-Cl}_2\text{]} \cdot \text{HCl}$$

| Exp. No. | R | R₁ | Amine starting reactant | Melting pt. of II in °C. |
|---|---|---|---|---|
| 1 | —(CH₂)₄—N(C₂H₅)₂ | H | (C₂H₅)₂N(CH₂)₄NH₂ | 178–179.5 |
| 2 | N-methylpiperazinyl (—N⟩N—CH₃) | | CH₃—N⟩NH | 286 |
| 3 | —CH₂CH₂N(C₂H₅)₂ | H | (C₂H₅)₂NCH₂CH₂NH₂ | 130–131.5 |
| 4 | —CH₂CH₂CH₂N(CH₃)₂ | H | (CH₃)₂NCH₂CH₂CH₂NH₂ | 228.5–230.5 |
| 5 | —CH₂CH₂N⟩O (morpholinoethyl) | H | O⟨NCH₂CH₂NH₂ | 245–252 |

EXAMPLE 9

6-(2-hydroxyethylcarbamoyl)-7-methoxy-2,3-dichloroquinoxaline

*Step A.*—A solution containing 24.2 g. (0.1 mole) methoxybenzoic acid in 500 ml. of ethanol is hydrogenated under 40 p.s.i. pressure over 5% palladium on carbon as a catalyst. After .6 mole of hydrogen has been consumed, the catalyst is removed by filtration, and the resulting solution concentrated to yield 4,5-diamino-2-methoxybenzoic acid.

*Step B.*—4,5-diamino-2-methoxybenzoic acid is converted to 2,3-dihydroxy-7-methoxyquinoxaline-6-carboxylic acid according to the procedure described in Example 4, Step A.

*Step C.*—2,3-dihydroxy-7-methoxyquinoxaline-6-carboxylic acid is converted to 6-chlorocarbonyl-7-methoxy-2,3-dichloroquinoxaline according to the procedure described in Example 4, Step B.

*Step D.*—6-chlorocarbonyl-7-methoxy-2,3-dichloroquinoxaline is converted to 6-(2-hydroxyethylcarbamoyl)-7-methoxy-2,3-dichloroquinoxaline according to the procedure described in Example 4, Step C.

What is claimed is:

1. A composition for inhibiting gastric acid secretion comprising an effective amount for inhibiting gastric acid secretion of a compound of the formula

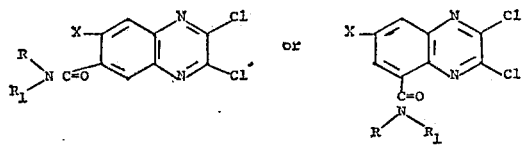

wherein X represents only hydrogen when the carbamoyl radical is in the 5-position and hydrogen, halo, loweralkyl or loweralkoxy when the carbamoyl radical is in the 6-position, and R and $R_1$ is selected from the group consisting of hydrogen, loweralkyl (straight, branched or cyclic),
haloloweralkyl,
phenylhydroxyloweralkyl,
diloweralkylaminoloweralkyl,
benzoylaminoloweralkyl,
loweralkanoylaminoloweralkyl,
hydroxyloweralkyl,
dihydroxyloweralkyl,
loweralkoxyloweralkyl,
benzoyloxyloweralkyl,
loweralkanoyloxyloweralkyl, loweralkyl substituted with a 5 or 6-membered heterocycle, containing one or more hetero atoms selected from the group consisting of oxygen, sulfur or nitrogen;

diloweralkylaminophenyl,
mono or dihalophenyl,
mono or diloweralkoxyphenyl,
mono or diloweralkylphenyl,
loweralkylhalophenyl,
loweralkylloweralkoxyphenyl,
loweralkoxyhalophenyl,
alkenyl,
alkynyl;

or a 5 or 6-membered heterocycle, having at least one hetero atom selected from the group consisting of oxygen, sulfur or nitrogen, with the proviso that one of R and $R_1$ is other than hydrogen; or R and $R_1$ may be joined together to form a heterocyclic group which may have a hetero atom selected from the group consisting of oxygen, sulfur or nitrogen in addition to the hetero nitrogen attached to the carbonyl function, and the hetero group formed may be substituted with a hydroxyl or a loweralkyl group, and the acid addition salts of the aforementioned compounds containing basic substituents in the carbamoyl radical, combined with a pharmaceutical carrier.

2. The composition of claim 1 wherein the quinoxaline is 6 - (2 - hydroxyloweralkylcarbamoyl) - 2,3 - dichloroquinoxaline.

3. The composition of claim 1 wherein the quinoxaline is 6 - (2 - hydroxyethylcarbamoyl) - 2,3 - dichloroquinoxaline.

4. The composition of claim 1 wherein the quinoxaline is 6 - (2 - dialkylaminoloweralkylcarbamoyl) - 2,3-dichloroquinoxaline or an acid addition salt thereof.

5. The composition of claim 1 wherein the quinoxaline is 6 - (2 - dimethylaminoethylcarbamoyl) - 2,3 - dichloroquinoxaline or the hydrochloride salt thereof.

References Cited
UNITED STATES PATENTS 3,184,284   4/1963   Kissa _____ 260—250
3,337,551   7/1967   Faith _____ 260—250

JEROME D. GOLDBERG, Primary Examiner

U.S. Cl. X.R.

424—248